United States Patent [19]

Beasley

[11] 3,742,556
[45] July 3, 1973

[54] MEAT EMULSION PUMP

[75] Inventor: Donald L. Beasley, Des Moines, Iowa

[73] Assignee: Townsend Engineering Company, Des Moines, Iowa

[22] Filed: July 2, 1971

[21] Appl. No.: 159,120

[52] U.S. Cl. .................................................. 17/37
[51] Int. Cl. .............................................. A22c 7/00
[58] Field of Search .................................. 17/37, 35

[56] References Cited
UNITED STATES PATENTS

| | | | |
|---|---|---|---|
| 2,837,762 | 6/1958 | Azzini et al. | 17/37 |
| 2,963,735 | 12/1960 | Gaudlitz | 17/37 |
| 3,543,330 | 12/1970 | Muller | 17/37 |

Primary Examiner—Lucie H. Laudenslager
Attorney—Zarley, McKee & Thomte

[57] ABSTRACT

A meat emulsion pump is disclosed herein which is well suited for use with meat processing machines such as frankfurter or sausage stuffing machines. The pump includes means for removing entrapped air bubbles from the meat emulsion and has a vacuum pump operatively connected thereto for removal of the released air from the pump interior. The vacuum pump communicates with the pump cavity between the pump discharge opening and the pump intake opening. The intake opening is positioned so that the emulsion enters the cavity at a location wherein the cavity has already begun to expand or increase. The pump cavity configuration of the pump is such that the meat passes through the pump in a smooth flowing manner without turbulance being created in the product thereby eliminating smear and "fat out" damage. An accumulator means is fluidly connected to the conduit extending from the pump to the meat processing machine. The accumulator means is adapted to supply the pumped emulsion to the processing machine under a constant pressure. The accumulator means also includes means for starting and stopping the pump so that the said constant pressure is assured and so that the emulsion is not recirculated.

9 Claims, 9 Drawing Figures

PATENTED JUL 3 1973
3,742,556
SHEET 1 OF 2
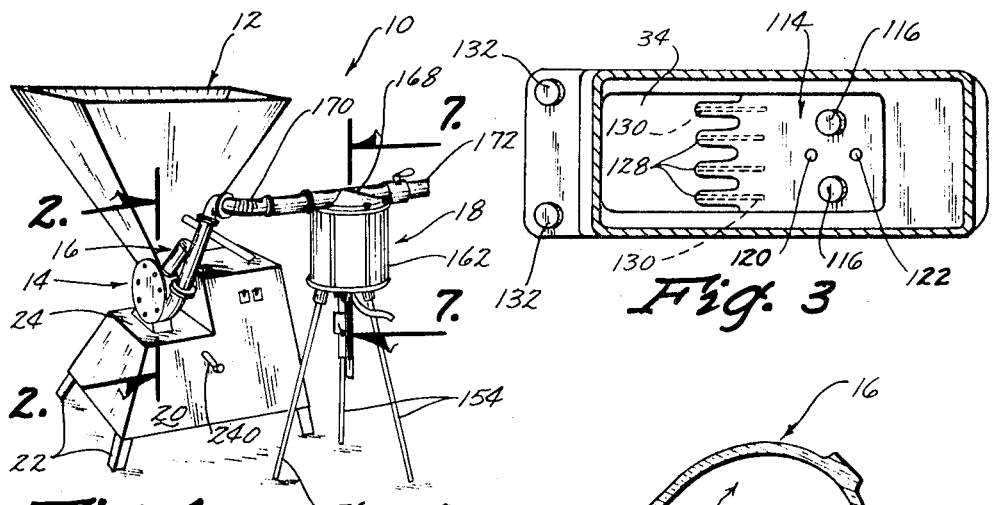
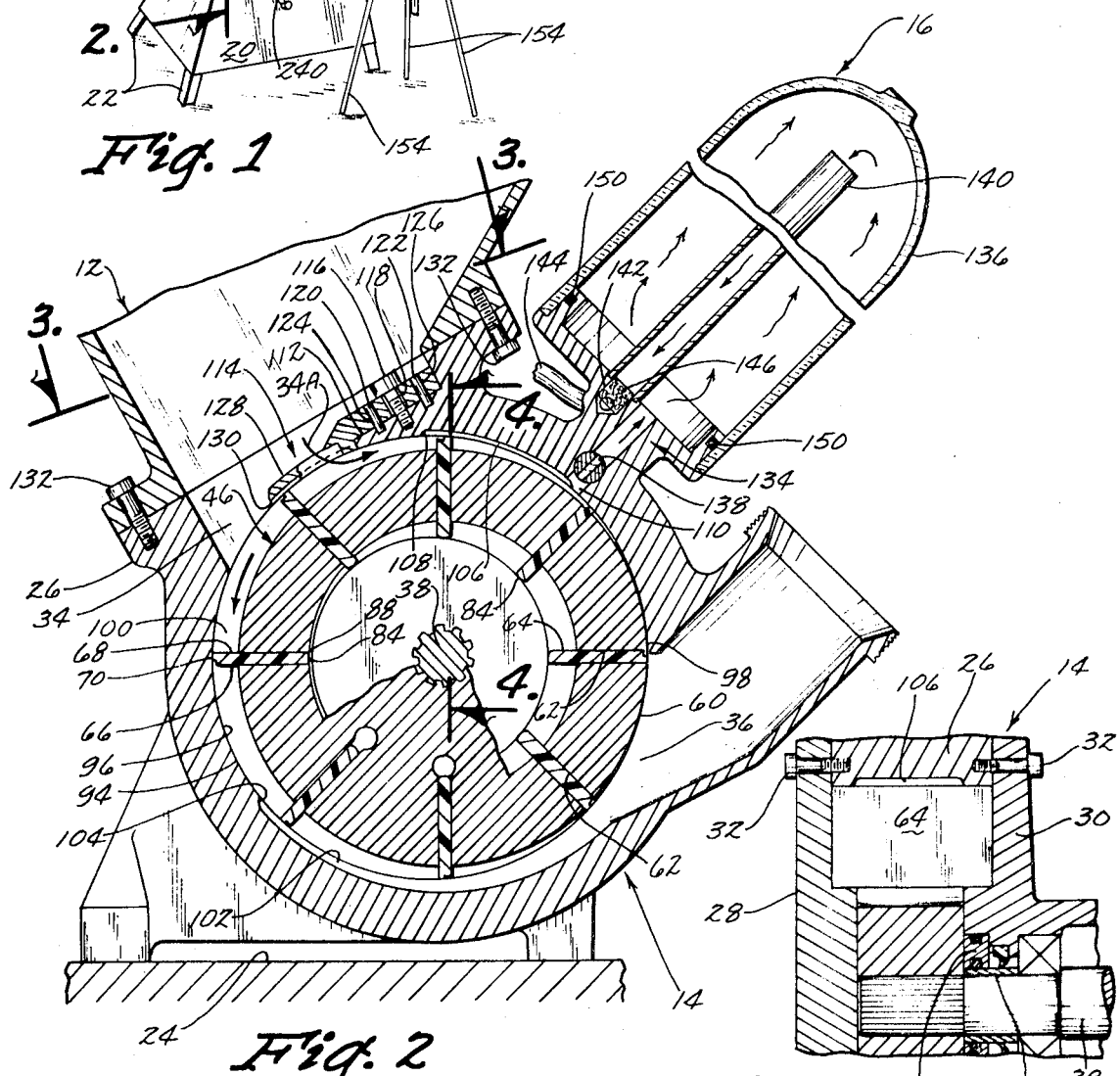
INVENTOR
DONALD L. BEASLEY
BY
Zarley, McKee & Thomte

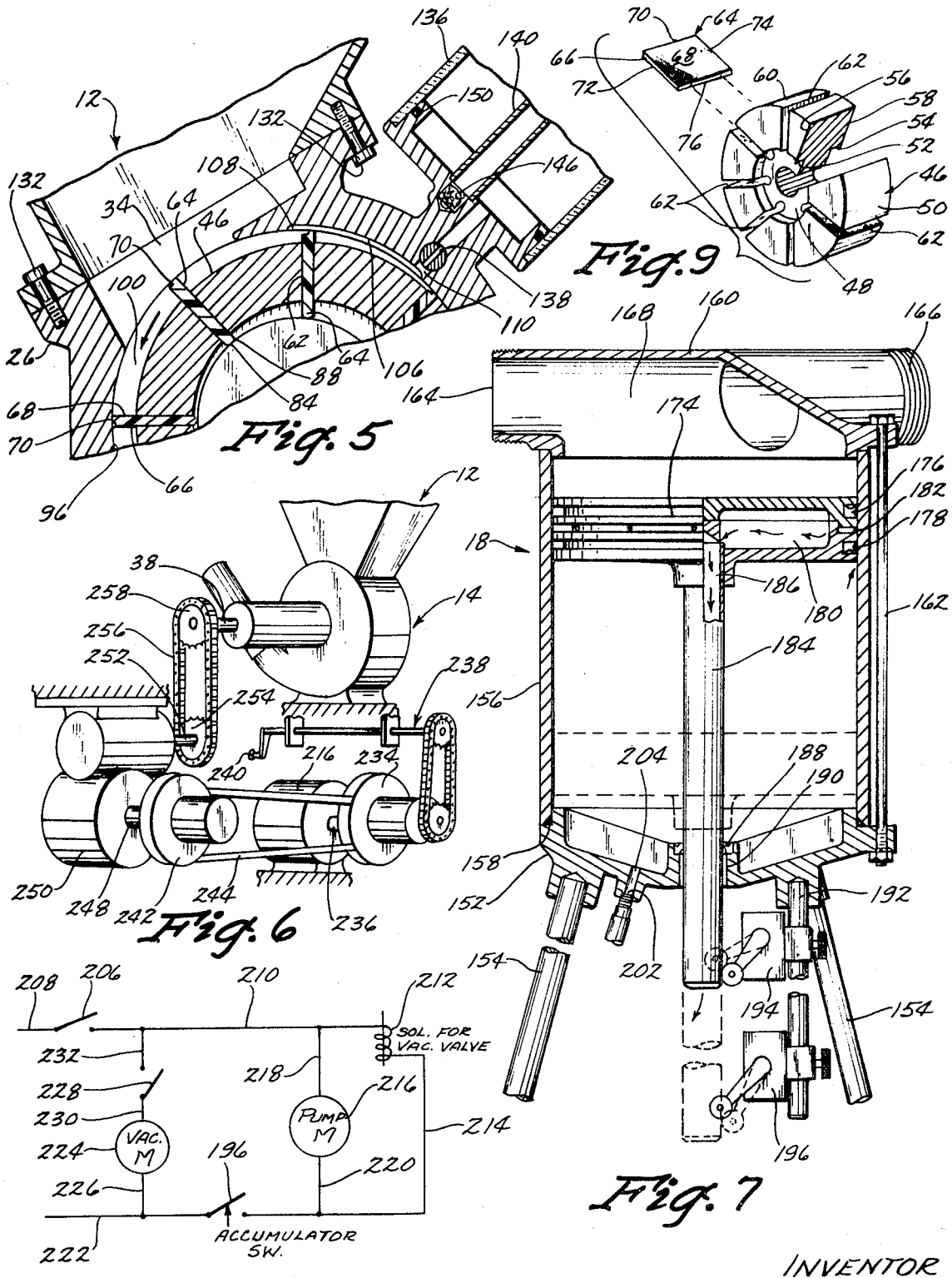

MEAT EMULSION PUMP

Meat processing machines such as frankfurter or sausage stuffing machines require that the meat emulsion be supplied thereto at a constant pressure so that the machine will uniformly stuff the emulsion into the casings or the like. The presence of air bubbles in the meat emulsion is undersirable since the air bubbles are conductive to the formation of harmful bacteria in the meat emulsion. It is also a critical necessity that the meat emulsion be treated gingerly during the pumping and stuffing thereof so that smear and "fat out" damage to the emulsion is prevented. Smear and "fat out" damage occurs if the product is not pumped in a smoothly flowing manner without turbulance being created therein. Smear damage is to be avoided since such damage results in the product exhibiting a fatty appearance. The "fat out" damage is the damage that occurs when the protein cell or particles in the emulsion are broken down which results in the cells or particles being unable to hold fat. Thus, the cells or particles "fat out" and leave globs of lard, etc. which appear in the product. The "fat out" damage occurs when excess pressure is imposed on the meat emulsion or if the meat emulsion is subjected to pressure for a considerable length of time. Additionally, distortion of the meat emulsion such as would occur if the meat emulsion were forced through a constricted area or moved around a severe corner, smear or "fat out" damage occurs. Such damage also occurs if the meat emulsion is recirculated by the meat pump.

Therefore, it is a principal object of this invention to provide a meat emulsion pump.

A further object of this invention is to provide a meat emulsion pump having means therein to remove the air bubbles from the meat emulsion and to extract the removed air from the pump itself.

A further object of this invention is to provide a meat emulsion pump and accumulator system which supplies the meat emulsion to a meat processing machine at a constant pressure.

A further object of this invention is to provide a meat emulsion pump wherein the meat emulsion is handled very gingerly as it passes therethrough.

A further object of this invention is to provide a meat emulsion pump and accumulator means wherein the meat emulsion is prevented from recirculating.

A further object of this invention is to provide a meat emulsion pump which prevents smear and "fat out" damage to the product.

A further object of this invention is to provide a meat emulsion pump wherein the meat emulsion passes through the pump in a smooth flowing manner without turbulance being created therein.

A further object of this invention is to provide a meat emulsion pump wherein the emulsion enters the pump at a location wherein the cavity has already begun to expand or increase.

A further object of this invention is to provide a meat emulsion pump which is economical of manufacture and durable in use.

These and other objects will be apparent to those skilled in the art.

This invention consists in the construction, arrangements and combination of the various parts of the device, whereby the objects contemplated are attained as hereinafter more fully set forth, specifically pointed out in the claims, and illustrated in the accompanying drawings, in which:

FIG. 1 is a perspective view of the meat emulsion pump and accumulator means of this invention:

FIG. 2 is an enlarged sectional view seen along lines 2—2 of FIG. 1 with portions thereof cut away to more fully illustrate the invention:

FIG. 3 is a sectional view seen along lines 3—3 of FIG. 2:

FIG. 4 is a fragmentary sectional view seen along lines 4—4 of FIG. 2:

FIG. 5 is a fragmentary sectional view similar to FIG. 2 except that the finger plate means of FIG. 2 has been omitted from the embodiment illustrated in FIG. 5:

FIG. 6 is a perspective view illustrating the power train of the invention:

FIG. 7 is a sectional view of the accumulator seen along line 7—7 of FIG. 1:

FIG. 8 is a schematic view illustrating the electrical circuitry of the invention; and FIG. 9 is a partial exploded view of the pump rotor and the rotor vanes with a portion of the rotor cut away to more fully illustrate the invention.

The meat emulsion pump of this invention is generally designated by the reference numeral 10 comprising generally a hopper 12, pump 14, vacuum jar assembly 16 and accumulator 18. A housing 20 is supported by legs 22 and includes a support area 24 upon which is mounted the pump 14. Pump 14 comprises a housing 26 having covers 28 and 30 closing the sides thereof by means of bolts 32 as seen in FIG. 4. Housing 26 is provided with a generally rectangular shaped intake opening 34 and a discharge opening 36 which communicate with the interior chamber or cavity of the pump housing as shown in FIG. 2.

Drive shaft 38 extends through bearing 40, bushing 42, and seal 44 in cover 30 in the manner illustrated in FIG. 4. Rotor 46 is splined onto the end of shaft 38 for rotation therewith and includes a central portion 48 and end portion 50 which includes shoulders 52, 54, sides 56, 58, and peripheral wall 60. A plurality of spaced apart slots 62 are formed in rotor 46 which receive the vanes 64 therein. Each of the vanes 64 is generally rectangular in shape and includes a leading side 66, trailing side 68, and edge portions 70, 72, 74 and 76 as illustrated in FIG. 9.

The vanes 64 move inwardly and outwardly with respect to the slots 62 as the rotor 46 is rotated. Likewise, rotor 46 is offset or eccentrically disposed with respect to the pump cavity 94 which is defined by wall 96. As seen in FIG. 2, the wall 60 of rotor 46 passes extremely close to the wall 96 just above the discharge opening 36 and such position will generally be referred to by the reference numeral 98. As illustrated in FIG. 2, the wall 60 of rotor 46 is spaced considerably from the wall 96 at the position generally referred to by the reference numeral 100. A channel 102 is formed in wall 96 and extends from 104 to the discharge opening 36. A channel 106 is also formed in wall 96 and extends from 108 to the opening 110 which extends through the housing 26.

Housing 26 is provided with a flat area 112 adjacent the intake opening 34 which is adapted to support a finger plate 114 thereon (FIG. 2). Finger plate 114 is mounted on the area 112 by means of bolts 116 extending through bolt openings 118 and being threadably received by the housing 26. Pins 120 and 122 extend downwardly through openings 124 and 126 respectively to further support the finger plate 114. Finger plate 114 includes spaced apart fingers 128 which have their undersides curved as illustrated in FIG. 2 to correspond to the wall 96. The fingers 128 also have slots 130 formed in their undersides. Hopper 12 is secured to the housing 26 by bolts 132 in the fashion seen in FIG. 2 so that the lower open end thereof is in communication with intake opening 34 and the fingers 128.

Housing 26 has a jar support 134 integrally formed therewith for supporting a glass vacuum jar 136 thereon. Opening 110 extends through housing 26 to provide communication between channel 106 and the interior of the jar 136. A solenoid operated valve means 138 is imposed in opening 110 for selectively preventing and permitting communication between the channel 106 and jar 136. A hollow pipe 140 is secured to the support 134 within jar 136 (FIG. 2) with its interior being in communication with a recessed area 142 which is in communication with a vacuum line 144. A filter media comprised of porus material, screen wire, or the like, is positioned in the recessed area 142 to prevent meat particles from entering the vacuum line 144 as will be described hereinafter. Vacuum line 144 extends from a vacuum motor 148 which creates a predetermined vacuum in jar 136. Seal 150 is positioned between support 134 and jar 136 to seal the interior of the jar 136 from the atmosphere.

Accumulator 18 includes a base 152 supported by legs 154. Body 156 is positioned on base 154 with a seal 158 being provided therebetween. Cover 160 is mounted on the upper end of body 156 with bolts 162 being employed to secure the cover 160 and body 156 to the base 152. Cover 160 includes an intake opening 164, discharge opening 166 and a manifold portion 168 therebetween which is positioned above the upper end of body 156. Pipe means 170 connects the intake opening 164 of accumulator 18 with the discharge opening 36 of pump 14. Pipe means 172 connects the discharge opening 166 with a meat stuffing machine (not shown). Piston 174 is slidably mounted in body 156 and has a pair of spaced apart sealing rings 176 and 178 extending around its periphery for sealing engagement with the inner wall surface of body 156. Piston 174 has an interior compartment 180 formed therein which communicates with a plurality of radially extending bores 182. The outer ends of the bores 182 are positioned between the rings 176 and 178 as shown in FIG. 7 to permit any air leaking by ring 178 to pass through the bores 182 into compartment 180. A hollow piston rod 184 is secured to piston 174 so that its interior 186 is in communication with compartment 180 to permit the air in compartment 180 to escape to the atmosphere through the lower end of the rod 184. Rod 184 slidably extends through seal 188 and opening 190 as seen in FIG. 7. Switch support 192 extends downwardly from base 152 and has a pair of switches 194 and 196 adjustably mounted thereon. Switches 194 and 196 have actuating switch arms 198 and 200 extending therefrom respectively which are engageable with the rod 184 to open and close the switches. Air line 202 is in communication with bore 204 for supplying air under pressure into the interior of the accumulator 18 below piston 174. The amount of air pressure supplied thereto may vary from 20 to 120 pounds depending upon such things as: (1) type of emulsion; (2) speed of pump; and (3) size or fragile character of casings.

With respect to FIG. 8, the numeral 206 refers to a master switch which is imposed in lead 208 extending from one side of a source electrical current. Lead 210 connects switch 206 with the solenoid 212 of the valve 138 which is connected to one side of accumulator switch 196 by lead 214. The pump motor 216 is connected to leads 210 and 214 by leads 218 and 220 respectively. Lead 222 connects the other side of accumulator switch 196 with the other side of the source of electrical current. Vacuum motor 224 provides the power for operating the vacuum pump connected to vacuum line 144. Motor 224 is electrically connected to lead 222 by lead 226 and electrically connected to switch 228 by lead 230. Switch 228 is electrically connected to lead 210 by lead 232. The circuitry for the air compressor supplying air to accumulator 18 has not been shown since it is of conventional design.

Pump motor 216 has a variable speed pulley means 234 provided on its drive shaft 236. The variable speed pulley means 234 is controlled by means of conventional crank assembly 238 which has a crank handle 240 positioned outwardly of housing 20 so that the operator can conveniently control the pump speed. Pulley means 234 is connected to another variable speed pulley means 242 by belt 244. Pulley means 244 is mounted on shaft 248 of gear box 250 which drives shaft 38 through shaft 252, sprocket 254, chain 256 and sprocket 258.

FIG. 5 illustrates a modified version of the device which omits a finger plate adjacent the intake opening of the pump. The preferred embodiment of the device utilizes a finger plate but it is possible to omit the same with somewhat reduced air removal efficienty being encountered.

The normal method of operation is as follows. The hopper 12 is filled with the emulsion and the master switch 206 and vacuum motor switch 228 are manually closed. The source of air pressure for the accumulator is also activated so that the desired air pressure is exerted on the underside of the piston 174 to raise the piston 174 to the position of FIG. 7 so that switch 196 is permitted to close. The above procedure causes pump 14 to be operated as well as simultaneously opening the valve 138 by means of the solenoid 212.

The opening of valve 138 causes a vacuum to be created in the pump cavity which serves to "charge" the cavity to draw the emulsion thereinto. The emulsion is drawn into the intake opening 34 through the fingers 128 of the finger plate 114 as shown by the arrow 34A (FIG. 2). The finger plate 114 breaks up the emulsion as it enters the cavity 94 so that air bubbles in the emulsion are exposed and freed from the emulsion itself. The configuration of the intake opening 34 causes the emulsion to be extruded into the cavity in a thin sheet so that a large surface area of emulsion is exposed to the vacuum present in the cavity 94. The embodiment illustrated in FIG. 5 does not employ a finger plate to break up the emulsion but merely causes the emulsion to be extruded into the pump cavity in a thin sheet to expose a large surface area of the emulsion to the vacuum. As previously stated, the embodiment of FIG. 5 is somewhat less efficient than the preferred embodiment although the embodiment of FIG. 5 does perform satisfactorily.

It is important to note that the positioning of the intake opening is such that the emulsion is drawn into the cavity 94 at a location after the cavity has begun to expand or enlarge. Due to the viscosity of an emulsion, the air bubbles that are embedded in the emulsion will tend to expand when the emulsion is subjected to a vacuum. The expansion of the air bubbles expands the volume of the entire emulsion. Since the emulsion enters the cavity at a location wherein the cavity has already begun to expand, the air bubbles at or near the surface of the emulsion will explode out of the emulsion. If the emulsion were to enter the cavity at a location wherein the rotor was positioned closely adjacent the wall 96 (e.g. 98), the expanding air bubbles would be limited or hindered by the wall 96 and would not be permitted to explode out of the emulsion. The location of the vacuum line is also very important since the location prevents the emulsion from feeding back into the vacuum system. The vacuum jar 136 merely acts as a safety and it is highly unlikely that any emulsion will ever flow against the movement of the rotor vanes 64 to get to the vacuum inlet. The distance between the vanes 64 is less than the distance between the vacuum inlet and the intake opening so that a vane 64 will always be positioned therebetween to prevent the emulsion from flowing into the vacuum inlet. The channel 106 permits the released air to flow towards the vacuum inlet.

The pump 10 causes the emulsion to be pumped therefrom outwardly through the discharge opening 36. The interior configuration of the pump is such that the emulsion is treated very gingerly during the pumping thereof so that smear and "fat out" damage to the emulsion is prevented. The emulsion is moved through the pump in a smoothly flowing manner without turbulance being created therein. It can be seen that the interior configuration of the pump 10 is such that the emulsion is not forced through a constricted area or moved around a severe corner thereby preventing smear and "fat out" damage. The configuration of the pump also prevents the emulsion from being recirculated due to the relationship of the rotor means, vanes and the wall 96.

The emulsion is supplied to the processing machine such as a frankfurter or sausage stuffing machine through the pipe means 170, accumulator 18 and pipe means 172. Under normal operating conditions, the piston 174 will remain in the position illustrated by solid lines in FIG. 7 due to the predetermined amount of air pressure therebelow. The accumulator 18 insures that the emulsion will be supplied to the processing machine under constant pressure to enable accurate metering of the emulsion to the processing machine. The accumulator 18 also permits the processing machine to be turned off at the processing machine without separately turning off the meal emulsion pump. If the processing machine is turned off, the pump 14 will continue to pump the emulsion to the accumulator which will cause the piston 174 to lower to permit the emulsion to fill the interior of the accumulator. The emulsion will continue to fill the interior of the accumulator until such time as the lower end of the piston rod 184 engages the switch 196 to de-activate the pump motor 216 which simultaneously closes the valve 134 since electrical power is no longer supplied to the solenoid 212. When the processing machine is again activated, the air pressure under the piston 174 will cause the piston 174 to raise as the processing machine requires emulsion. Upward movement of the piston 174 causes the rod 184 to disengage from the switch 196 which then causes pump motor 216 to be energized and simultaneously causing the valve 138 to be opened since electrical power is again furnished to the solenoid 212. As previously stated, the air pressure beneath piston 174 may be varied from 20 to 120 pounds depending upon the type of emulsion and the speed of the pump. For example, low pressure would be supplied to the interior of accumulator 18 if the processing machine was handling fragile products or small casings. The accumulator 18 controls the entire system and insures that the emulsion will be supplied to the processing machine under constant pressure as previously discussed. The variable speed mechanism associated with the pump motor 216 permits the pump to be precisely controlled so that the volume of emulsion can be selectively adjusted depending upon the volume of product being processed.

The accumulator 18 insures that the pump will only pump the emulsion once since the pump will be shut off upon the piston 174 reaching a predetermined position in the accumulator 18. The accumulator 18 insures that excess pressure will not be imposed on the emulsion to prevent the protein cells or particles of the emulsion from being broken down thereby preventing "fat out" damage to the emulsion.

Switch 194 has been illustrated merely to illustrate that the piston rod 184 can be used to actuate additional mechanisms so that the accumulator could be used as a proportioning device.

Thus it can be seen that an extremely novel emulsion pump has been provided which accomplishes at least all of its stated objectives.

I claim:

1. An emulsion pump comprising,
a rotary pump means comprising a housing having intake and discharge openings formed therein, a rotor means rotatably mounted in said housing for pumping an emulsion,
and a vacuum means in communication with said housing for creating a vacuum in said housing to remove air from the emulsion,
said rotor means having a plurality of spaced apart slots formed therein extending radially inwardly from the periphery thereof; a rotor vane radially movably mounted in each of said slots, said housing having a cavity formed therein in which said rotor means is positioned, said cavity being defined by a generally annular wall surface, said rotor means having its axis of rotation offset with respect to the center of said cavity, and means in said housing for moving said vanes in said slots so that said vanes wipe upon said wall surface as said rotor means rotates,
said housing having a vacuum port means formed therein, said vacuum means being in communication with said vacuum port means, said vacuum port means being positioned between said discharge and intake openings on the downstream side of said discharge opening, said wall surface having a channel means formed therein extending from said vacuum port means towards said intake opening,
said valve means being mounted in said vacuum port means for selectively opening and closing said vacuum port means.

2. An emulsion pump comprising,
a rotary pump means comprising a housing having intake and discharge openings formed therein, a rotor means rotatably mounted in said housing for pumping an emulsion, and a vacuum means in communication with said housing for creating a vacuum in said housing to remove air from the emulsion, said rotor means having a plurality of spaced apart slots formed therein extending radially inwardly from the periphery thereof; a rotor vane radially movably mounted in each of said slots, said housing having a cavity formed therein in which said rotor means is positioned, said cavity being defined by a generally annular wall surface, said rotor means having its axis of rotation offset with respect to the center of said cavity, and means in said housing for moving said vanes in said slots so that said vanes wipe upon said wall surface as said rotor means rotates, said housing having a vacuum port means formed therein, said vacuum means being in communication with said vacuum port means, said vacuum port means being positioned between said discharge and intake openings on the downstream side of said discharge opening, said wall surface having a channel means formed therein extending from said vacuum port means towards said intake opening, a vacuum jar means secured to said housing in communication with said vacuum means and said vacuum port means, and means in said vacuum jar means for preventing emulsion particles from entering the vacuum means system.

3. The emulsion pump of claim 2 wherein said means in said vacuum jar means comprises an elongated hollow pipe having one end thereof in communication with said vacuum means, the other end of said pipe being positioned in a spaced apart relationship with said vacuum port means, and a filter means at said one end of said pipe.

4. An emulsion pump comprising, a rotary pump means comprising a housing having intake and discharge openings formed therein, a rotor means rotatably mounted in said housing for pumping an emulsion, and a vacuum means in communication with said housing for creating a vacuum in said housing to remove air from the emulsion, said housing having a cavity formed therein in which said rotor means is positioned, said cavity being defined by a generally annular wall surface, said rotor means having its axis of rotation offset with respect to the center of said cavity so that the space between said rotor means and said wall surface increasingly enlarges in the direction of rotation of said rotor means, from said discharge opening to said intake opening, said vacuum means being in communication with said cavity between said discharge opening and said intake opening, said intake opening being positioned with respect to said housing so that the emulsion enters the cavity at a location wherein the said space between said rotor means and said wall surface has at least partially increased so that said vacuum means can communicate with the emulsion entering said cavity to remove air from the emulsion, and a finger plate means at least partially extending over said intake opening to break up the emulsion entering the cavity.

5. An emulsion pump comprising, a rotary pump means comprising a housing having intake and discharge openings formed therein, a rotor means rotatably mounted in said housing for pumping an emulsion, and a vacuum means in communication with said housing for creating a vacuum in said housing to remove air from the emulsion, and a finger plate means at least partially extending over said intake opening for releasing entrapped air bubbles from said emulsion entering the cavity.

6. The emulsion pump of claim 5 wherein said finger plate means has a plurality of spaced apart fingers extending at least partially over said intake opening, at least a portion of the emulsion entering said housing between said spaced part fingers.

7. The emulsion pump of claim 6 wherein said rotor means has a plurality of spaced apart rotor vanes extending therefrom which are adapted to wipe upon said finger plate means.

8. An emulsion pump comprising, a rotary pump means comprising a housing having intake and discharge openings formed therein, a rotor means rotatably mounted in said housing for pumping an emulsion, and a vacuum means in communication with said housing for creating a vacuum in said housing to remove air from the emulsion, said rotor means having a plurality of spaced apart slots formed therein extending radially inwardly from the periphery thereof; a rotor vane radially movably mounted in each of said slots, said housing having a cavity formed therein in which said rotor means is positioned, said cavity being defined by a generally annular wall surface, said rotor means having its axis of rotation offset with respect to the center of said cavity, and means in said housing for moving said vanes in said slots so that said vanes wipe upon said wall surface as said rotor means rotates, said housing having a vacuum port means formed therein, said vacuum means being in communication with said vacuum port means, said vacuum port means being positioned between said discharge and intake openings on the downstream side of said discharge opening, said wall surface having a channel means formed therein extending from said vacuum port means towards said intake opening, the length of said channel means being sufficient so as to provide communication between said intake opening and said vacuum port means.

9. An emulsion pump comprising, a rotary pump means comprising a housing having intake and discharge openings formed therein, a rotor means rotatably mounted in said housing for pumping an emulsion, and a vacuum means in communication with said housing for creating a vacuum in said housing to remove air from the emulsion, said pump means having means at its intake opening to cause the emulsion to be extruded into said cavity in a thin sheet so that a large surface area of emulsion is exposed to the vacuum present in said cavity.

* * * * *